(12) United States Patent
Baughman et al.

(10) Patent No.: US 12,373,728 B2
(45) Date of Patent: Jul. 29, 2025

(54) SHARING AND EXECUTING CUSTOM MACHINE LEARNING ALGORITHMS

(71) Applicant: INTERNATIONAL BUSINESS MACHINES CORPORATION, Armonk, NY (US)

(72) Inventors: Aaron K. Baughman, Cary, NC (US); Sai Krishna Reddy Gudimetla, Jersey City, NJ (US); Micah Forster, Round Rock, TX (US); Sidhartha Balodi, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 1095 days.

(21) Appl. No.: 16/948,652

(22) Filed: Sep. 28, 2020

(65) Prior Publication Data

US 2022/0101174 A1    Mar. 31, 2022

(51) Int. Cl.
*G06N 20/00* (2019.01)
(52) U.S. Cl.
CPC .................................. *G06N 20/00* (2019.01)
(58) Field of Classification Search
CPC .............................. G06N 20/00; G06N 20/10
See application file for complete search history.

(56) References Cited

U.S. PATENT DOCUMENTS

| | | | |
|---|---|---|---|
| 8,554,898 B2 | 10/2013 | Chess | |
| 9,544,327 B1 | 1/2017 | Sharma | |
| 10,043,035 B2 | 8/2018 | Lafever | |
| 11,593,634 B2 * | 2/2023 | Choudhary | G06N 3/084 |
| 2009/0313631 A1 | 12/2009 | De Marzo | |
| 2019/0138940 A1 * | 5/2019 | Feuz | G06F 9/46 |
| 2019/0213346 A1 | 7/2019 | Friedman | |
| 2020/0005081 A1 | 1/2020 | Nah | |

(Continued)

FOREIGN PATENT DOCUMENTS

| | | |
|---|---|---|
| CN | 107977738 A | 5/2018 |
| CN | 110266771 A | 9/2019 |

(Continued)

OTHER PUBLICATIONS

Zheng et al., Lazy Paired Hyper-Parameter Tuning, 2013, IJCAI: Twenty-third International Joint Conference on Artificial Intelligence, 2013. (Year: 2013).*

(Continued)

*Primary Examiner* — Kamran Afshar
*Assistant Examiner* — Steven H Phung
(74) *Attorney, Agent, or Firm* — CHIP LAW GROUP

(57) ABSTRACT

An embodiment of the invention may include a method, computer program product, and computer system for managing a machine learning algorithm. The embodiment may include a computing device that distributes a first algorithm to a plurality of computing devices. The embodiment may include updates to the first algorithm, to create a second algorithm, by a first device of the plurality of computing devices. The first device is grouped with other devices in a first cluster of devices of the plurality of computing devices. The first cluster of computing devices comprises more than one computing device. Updating the first algorithm is performed based on information shared amongst the first cluster of devices.

9 Claims, 7 Drawing Sheets

(56) References Cited

U.S. PATENT DOCUMENTS

| | | | |
|---|---|---|---|
| 2020/0027019 A1 | 1/2020 | Yang | |
| 2020/0320340 A1* | 10/2020 | Wentz | G06F 18/22 |
| 2021/0357800 A1* | 11/2021 | Sharma | G06N 20/00 |
| 2022/0094605 A1* | 3/2022 | Zaman | H04L 67/1097 |

FOREIGN PATENT DOCUMENTS

| | | |
|---|---|---|
| JP | 2016161967 A | 9/2016 |
| KR | 20190096872 A | 8/2019 |
| KR | 20190103090 A | 9/2019 |

OTHER PUBLICATIONS

Aldhalaan, et al., "Autonomic Allocation of Communicating Virtual Machines in Hierarchical Cloud Data Centers," 2014 International Conference on Cloud and Autonomic Computing, Sep. 8-12, 2014 [accessed on Jul. 27, 2020], pp. 161-171, London, UK, DOI: 10.1109/ICCAC.2014.13, Retrieved from the Internet: <URL: https://ieeexplore.ieee.org/document/7024057>.

Börjesson, et al., "Continuing professional development by practitioner integrated learning," OOPSLA '07: Companion to the 22nd ACM SIGPLAN conference on Object-oriented programming systems and applications companion, Oct. 2007, pp. 897-907, ACM 978-1-59593-865-7/07/0010, Montreal, Quebec, CA, Retrieved from the Internet: <URL: https://dl.acm.org/doi/10.1145/1297846.1297941>.

Disclosed Anonymously, "A System for Sharing Data Between Machine Learning Systems", An IP.com Prior Ar Database Technical Disclosure, Feb. 28, 2018, 4 pages, IP.com No. IPCOM000253029D.

Disclosed Anonymously, "Applying machine learning techniques to determine product risks", An IP.com Prior Art Database Technical Disclosure, Jan. 7, 2019, 29 pages, IP.com No. IPCOM000256883D.

Disclosed Anonymously, "Ranking and automatic selection of machine learning models", An IP.com Prior Art Database Technical Disclosure, Jan. 3, 2018, 34 pages, IP.com No. IPCOM000252275D.

Hao, et al., "Efficient and Privacy-Enhanced Federated Learning for Industrial Artificial Intelligence," IEEE Transactions on Industrial Informatics, Oct. 2020 [accessed on Jul. 27, 2020], pp. 6532-6542, vol. 16, No. 10, DOI: 10.1109/TII.2019.2945367, Retrieved from the Internet: <URL: https://ieeexplore.ieee.org/document/8859260>.

Iima, et al., "Multi-objective reinforcement learning for acquiring all Pareto optimal policies simultaneously—Method of determining scalarization weights," 2014 IEEE International Conference on Systems, Man, and Cybernetics (SMC), Oct. 5-8, 2014 [accessed on Jul. 27, 2020], pp. 876-881, San Diego, CA, USA, DOI: 10.1109/SMC.2014.6974022, Retrieved from the Internet: <https://ieeexplore.ieee.org/document/6974022>.

Kairouz, et al., "Advances and Open Problems in Federated Learning", Dec. 10, 2019, 105 pages, arXiv:1912.04977v1.

Lee, "Determining an Optimal Mix of Hybrid Cloud Computing for Enterprises," UCC '17 Companion: Companion Proceedings of the10th International Conference on Utility and Cloud Computing, Dec. 5-8, 2017, pp. 53-58, DOI: 10.1145/3147234.3148109, Austin, TX, Retrieved from the Internet: <URL: https://dl.acm.org/doi/10.1145/3147234.3148109>.

Li, et al., "An End-to-End Encrypted Neural Network for Gradient Updates Transmission in Federated Learning," 2019 Data Compression Conference (DCC), Mar. 26-29, 2019, p. 589 [accessed on Jul. 27, 2020], DOI 10.1109/DCC.2019.00101, Retrieved from the Internet: <URL: https://ieeexplore.ieee.org/document/8712695>.

Li, et al., "Federated Learning: Challenges, Methods, and Future Directions," IEEE Signal Processing Magazine, May 2020 [accessed on Jul. 27, 2020], pp. 50-60, vol. 37, Issue 3, DOI: 10.1109/MSP.2020.2975749, Retrieved from the Internet: <URL: https://ieeexplore.ieee.org/document/9084352>.

Mell, et al., "The NIST Definition of Cloud Computing", National Institute of Standards and Technology, Special Publication 800-145, Sep. 2011, 7 pages.

Nadiger, et al. "Federated Reinforcement Learning For Fast Personalization," 2019 IEEE Second International Conference on Artificial Intelligence and Knowledge Engineering (AIKE), Jun. 3-5, 2019 [accessed on Jul. 27, 2020], pp. 123-127, DOI 10.1109/AIKE.2019.00031, Retrieved from the Internet: https://ieeexplore.ieee.org/document/8791693>.

Nguyen, et al., "Federated Learning in Mobile Edge Networks: A Comprehensive Survey", ResearchGate, Sep. 2019 [Uploaded Oct. 2, 2019], 31 pages, Retrieved from the Internet: <URL: Federated Learning in Mobile Edge Networks: A Comprehensive Survey>.

Talagala, et al., "ECO: Harmonizing Edge and Cloud with ML/DL Orchestration," Workshop on Hot Topics in Edge Computing (HotEdge 18), 2018, 7 pages, UNENIX, Boston, MA, Retrieved from the Internet: <URL: https://www.usenix.org/conference/hotedge18/presentation/talagala>.

Thomason, et al., "Parameter Optimisation for Location Extraction and Prediction Applications," 2015 IEEE International Conference on Computer and Information Technology; Ubiquitous Computing and Communications; Dependable, Autonomic and Secure Computing; Pervasive Intelligence and Computing, Oct. 26-28, 2015 [accessed on Jul. 27, 2020], pp. 2173-2180, Liverpool, UK, DOI: 10.1109/CIT/IUCC/DASC/PICOM.2015.322, Retrieved from the Internet: <URL: https://ieeexplore.ieee.org/document/7363368>.

Wang, et al. "Convex Hull-Based Multiobjective Genetic Programming for Maximizing Receiver Operating Characteristic Performance," IEEE Transactions on Evolutionary Computation, Apr. 2015 [accessed on Jul. 27, 2020], pp. 188-200, vol. 19, No. 2, DOI: 10.1109/TEVC.2014.2305671, Retrieved from the Internet: <URL: https://ieeexplore.ieee.org/document/6762993>.

Zhu, et al. "Multi-Objective Evolutionary Federated Learning," IEEE Transactions on Neural Networks and Learning Systems, Apr. 2020 [accessed on Jul. 27, 2020], pp. 1310-1322, vol. 31, No. 4, DOI: 10.1109/TNNLS.2019.2919699, Retrieved from the Internet: <URL: https://ieeexplore.ieee.org/document/8744465>.

* cited by examiner

SHARING AND EXECUTING CUSTOM MACHINE LEARNING ALGORITHMS

BACKGROUND

The present invention relates to artificial intelligence (AI), and more specifically, to distributed AI systems.

Machine learning (ML) is the study of computer algorithms that improve automatically through experience. It is seen as a subset of artificial intelligence. Machine learning algorithms build a mathematical model based on sample data, known as "training data", in order to make predictions or decisions without being explicitly programmed to do so. Machine learning algorithms are used in a wide variety of applications, such as email filtering and computer vision, where it is difficult or infeasible to develop conventional algorithms to perform the needed tasks.

In machine learning, lazy learning is a learning method in which generalization of the training data is, in theory, delayed until a query is made to the system, as opposed to eager learning, where the system tries to generalize the training data before receiving queries. The primary motivation for employing lazy learning, as in the K-nearest neighbors algorithm, used by online recommendation systems ("people who viewed/purchased/listened to this movie/item/tune also . . . ") is that the data set is continuously updated with new entries (e.g., new items for sale at an online marketplaceat Amazon, new movies to view at an online video-on-demand service, new clips at an online video sharing platform, or new music at an online music service). Because of the continuous update, the "training data" would be rendered obsolete in a relatively short time especially in areas like books and movies, where new best-sellers or hit movies/music are published/released continuously. Therefore, one cannot really talk of a "training phase."

BRIEF SUMMARY

An embodiment of the invention may include a method for managing a machine learning algorithm. The method may include a computing device that distributes a first algorithm to a plurality of computing devices. The method may include updates to the first algorithm, to create a second algorithm, by a first device of the plurality of computing devices. The first device is grouped with other devices in a first cluster of devices of the plurality of computing devices. The first cluster of computing devices comprises more than one computing device. Updating the first algorithm is performed based on information shared amongst the first cluster of devices.

Another embodiment of the invention provides a computer program product for managing a machine learning algorithm. The computer program product may include a computing device that distributes a first algorithm to a plurality of computing devices. The computer program product may include updates to the first algorithm, to create a second algorithm, by a first device of the plurality of computing devices. The first device is grouped with other devices in a first cluster of devices of the plurality of computing devices. The first cluster of computing devices comprises more than one computing device. Updating the first algorithm is performed based on information shared amongst the first cluster of devices.

Another embodiment of the invention provides a computer system for managing a machine learning algorithm. The computer system may include a computing device that distributes a first algorithm to a plurality of computing devices. The computer system may include updates to the first algorithm, to create a second algorithm, by a first device of the plurality of computing devices. The first device is grouped with other devices in a first cluster of devices of the plurality of computing devices. The first cluster of computing devices comprises more than one computing device. Updating the first algorithm is performed based on information shared amongst the first cluster of devices.

DETAILED DESCRIPTION

Figure 1:
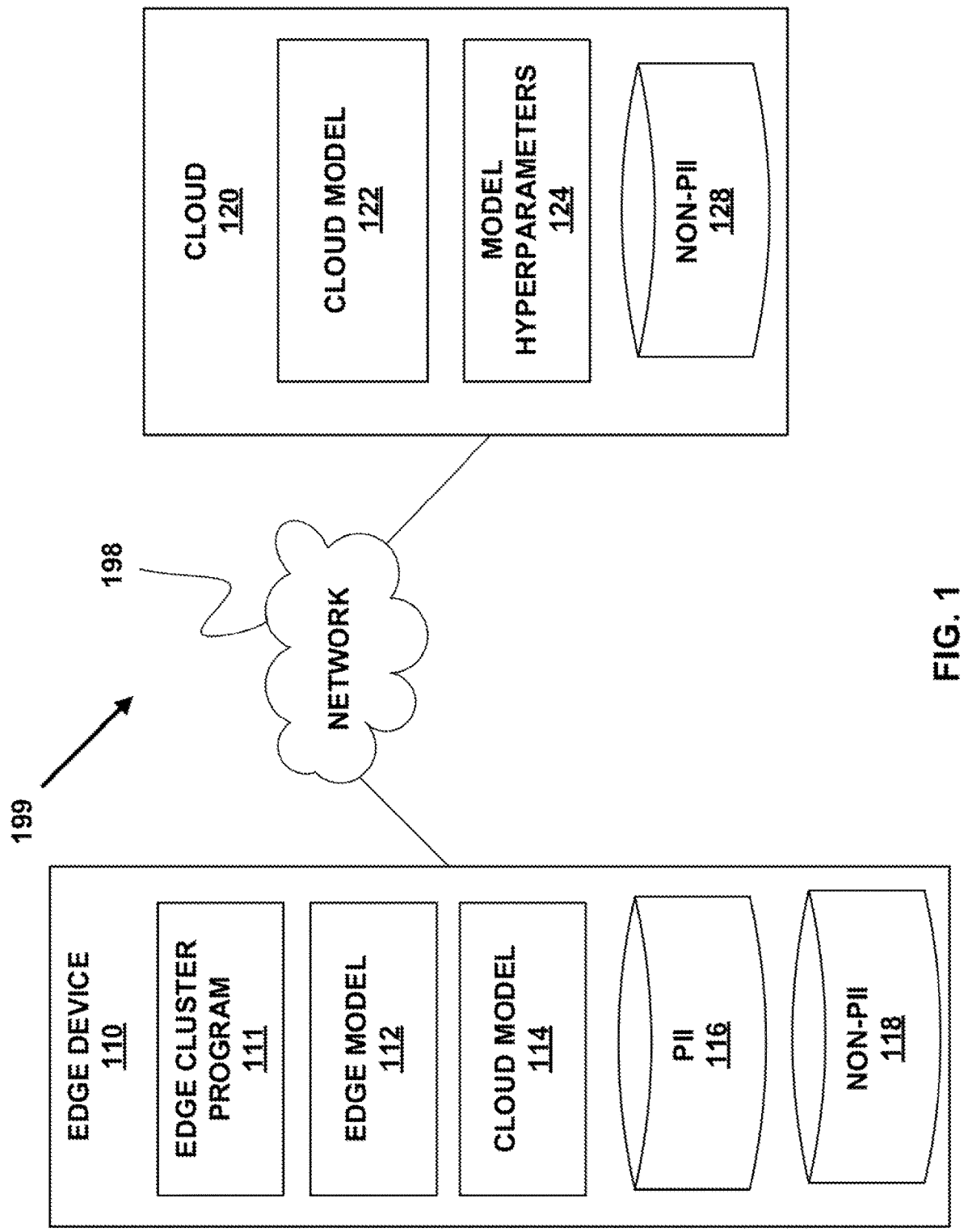
FIG. 1 illustrates a distributed AI system, in accordance with an embodiment of the invention.

Embodiments of the present invention will now be described in detail with reference to the accompanying Figures.

Computation and privacy are two big challenges in creating AI systems today. Privacy has created multiple challenges with how to build models regarding certain types of data while keeping such data in places users are comfortable with. Regulations like GDPR have necessitated a change in how user data is stored and used in training/testing the models. Additionally, large scale optimization problems with many different combinations require a lot of computational power to explore feasible solutions. Under heavy cloud traffic, the raw amount of service demand would exhaust an origin server very quickly. Therefore, approaches for machine learning algorithms that handle privacy and also computing it in a distributed environment on the edge are desirable. As a result, some systems move portions of the computing to the edge in order to precompute as many predictors as possible. As the environment of the items under consideration are tailored towards a specific audience or user, the number of computations that can live on the cloud decrease. Unfortunately, if the computing is delegated to edge devices, the amount of traffic that invoke third party API's will increase exponentially which can prove to be costly and potentially unsustainable. Given the challenges of computing, privacy and learning from user data in such a context especially for problems where we are trying to create a new user behavior, a new graph database is described below based on an asynchronous federated machine learning approach which does localized training on the edge and only shares the hyperparameters of the PII model to the cloud-thus completely masking the user data and creating a learning system learning from the user behavior. In addition-we will also incorporate a machine learning algorithm for the network flow of edge devices. The combination of the machine learning algorithm for the network flow of edge devices, along with implementing lazy learning techniques on edge devices, reduces peak usage of cloud nodes and reduces the bandwidth requirements.

In such an environment, each edge device will have its own model. The edge devices are connected to other edge devices based on relationship. For example, in fantasy football, player's edge devices are connected to other edge devices if they are part of the same league. They can issue queries across the network to retrieve the information from their device such who is their roster. In this way, we are creating links to retrieve data from other edge devices instead of the 3rdparty APIs. In massive load consumer facing applications, we have to protect our origin servers. In order to do this, we build and apply models a priori. However, under large combinatorial problems, we are unable to precompute solutions. Instead, our architecture precomputes broad variables on the cloud and mixes it with PII based user models on the edge to save on cloud cycles. The graph nodes are connected within the cloud to create ensemble of regional based models. Each node has a model trained on a specific stratification of the data. For example, in Fantasy Football, we will have a group of nodes connected based on team and locations such as leagues in the Northeast. The dynamically created ensemble of models is specific to a data situation that is needed by the edge. The application of the cloud ensemble that is mixed together with the edge device creates a highly tuned and customized state probability.

In essence, the cloud models handle data stratification combinations while the edge models handle user modeling and state combinations.

FIG. 1 illustrates a localized learning system 199, in accordance with an embodiment of the invention. In an example embodiment, localized learning system 199 includes an edge device 110 and a cloud 120 interconnected via a network 198.

In the example embodiment, network 198 is the Internet, representing a worldwide collection of networks and gateways to support communications between devices connected to the Internet. Network 198 may include, for example, wired, wireless or fiber optic connections. In other embodiments, network 198 may be implemented as an intranet, a local area network (LAN), or a wide area network (WAN). In general, network 198 can be any combination of connections and protocols that will support communications between the edge device 110 and the cloud 120.

Cloud 120 may include an edge cluster program, a cloud model 122, edge model hyperparameters, and non-PII 128 collected from one or more edge devices 110. Cloud 120 may include a cluster of web servers executing the same software to collectively handle the information created by edge device 110 and optimizing a cloud model 122. In an example embodiment, cloud 120 is a computing device, or collection of computing devices, that may store edge model hyperparameters 124 and non-PII 128 on cloud 120. Cloud 120 is described in more detail with reference to FIGS. 1 and 2.

Cloud model 122 may be an Artificial Intelligence (AI) or Machine Learning (ML) model trained on a collection of global data to solve a particular problem. Cloud model 122 may use AI algorithms such as, for example, Linear Regression, logistical Regression, Random Forest, Gradient Boosted Trees, Support Vector Machines (SVM), Neural Networks (including Convolutional Neural Networks and Deep Learning networks), Decision Trees, Naive Bayes, and Nearest Neighbor. In addition to the model selected, pre-processing techniques such as k-means clustering, mixture models, hierarchical clustering, hidden Markov models, blind signal separation, self-organizing maps (SOMs), adaptive resonance theory (ART), and any other applicable methods, may be used in conjunction with the AI algorithm to improve outputs based on the source data. Additionally, transformers or feature engineering elements may be included in the cloud model 122. The cloud model 122 may include one or more of each of the above types of elements in the final model. Hyperparameter optimization of the cloud model 122 may be based on any number of performance metrics to score the accuracy, precision, performance and any other relevant metrics such as R2, F1, ROC AUC, and Precision scores, in order to create global parameters for the cloud model 122. Additionally, scoring and update algorithms may be contained in the global cloud model 122 to enable local updating at an edge device 110, creating an edge model 112, so that information need not be continuously passed to the cloud for retraining of the cloud model 122. Further, cloud model 122 may be initially trained on a global set of information but may be subsequently updated based on updated model parameters of different edge models 112 received from edge devices 110.

Model hyperparameters 124 may include hyperparameters from the trained cloud model 122 to be used in each edge model 112. Such hyperparameters may enable each edge model to function similarly, with modifications based on effects specific to the cluster that each edge device 110 may be associated with. Additionally, model hyperparameters may include modifications to hyperparameters or weights received back from different edge models 112, which may be used in periodically retraining the cloud model.

Edge device 110 includes an edge model 112, a cloud model 114, Personally Identifiable Information (PII) 116 and non-PII 118. In the example embodiment, edge device 110 is a desktop computer, a notebook or a laptop computer; however, in other embodiments, edge device 110 may be a smart phone, a tablet computer, a handheld device, a thin client, or any other electronic device or computing system capable of receiving and sending data to and from cloud 120 via network 198, and capable of storing PII 116 and non-PII 118, and updating parameters of edge model 112. Additionally, edge device 110 is capable of communicating to other edge devices 110 in the ecosystem or working in concert to update edge model 112. Components of edge device 110 are described in more detail with reference to FIG. 3.

Cloud model 114 is a local copy of cloud model 122. Cloud model 114 may contain the selected elements and algorithms used to create cloud model 122, as well as model hyperparameters 124. Cloud model 114 may be a static version that may be periodically referred to by edge model 112 for comparison to ensure there is not unnecessary model drift.

Edge model 112 is a version of the cloud model 122 that has been modified based on behavior of users of edge devices 110 within a cluster. In such models, knowledge graphs, weights, or other local parameters may be modified based upon the PII 116 and non-PII 118 of users in the cluster.

Edge cluster program 111 may enable edge device 110 to communicate with other edge devices located in a similar edge cluster and update the edge model 112 located on edge device 110. Updates to the edge model 112 by edge cluster program 111 may be done using a lazy learning method on the edge model 112, based on information contained in PII 116 and non-PII 118. In such instances, PII 116 and non-PII 118 may be shared amongst edge devices 110 in an edge cluster in order to update the edge model 141. Edge cluster program 111 may enable edge devices 110 to share PII 116 and non-PII 118 in order to generate, or update, edge model 112 outside of the cloud 120. Additionally, or alternatively, edge cluster program 111 may use PII 116 and non-PII 118 located only on the edge device 110, and send updated weights or parameters affected by the lazy learning method to other devices in the cluster. In such embodiments, updated weighting may be based on the number of previous interactions with the model and model fit to an individual or cluster.

Additionally, edge cluster program 111 may use machine learning models, derived a user's usage of the edge device and application containing the edge cluster program 111, to determine when the edge cluster program 111 communicates with other edge devices 110 in order to share the edge model 112. In one embodiment, the machine learning models may account for an edge devices connectivity (e.g., times of day the device is connected to wi-fi), a device's usage characteristics (e.g., computations and network bandwidth at different times of the day), and application accessibility characteristics to determine when an edge device 110 may be available to transmit an edge model 112 to other edge devices, and/or to the cloud 120. By enabling edge to edge transfer in this manner, usage of cloud 120 may be reduced.

PII 116 may be specific user data that alone, or in the aggregate, may be used to identify a particular person. Examples include a full name, Social Security number, driver's license number, bank account number, passport number, and email address, usernames, current or former physical address, zip code, etc.

Non-PII 118 may be any additional information that is relevant to edge model 112 or cloud model 114 but does not contain sensitive information. Such information may include choices or decisions made by a user of edge device 110 with respect to the model, as well as any generic information that might have predictive value in edge model 112 or cloud model 114. Additionally, non-PII 118 may contain model parameters for edge model 112 based on updates from edge cluster program 111 using lazy learning techniques.

Figure 2:
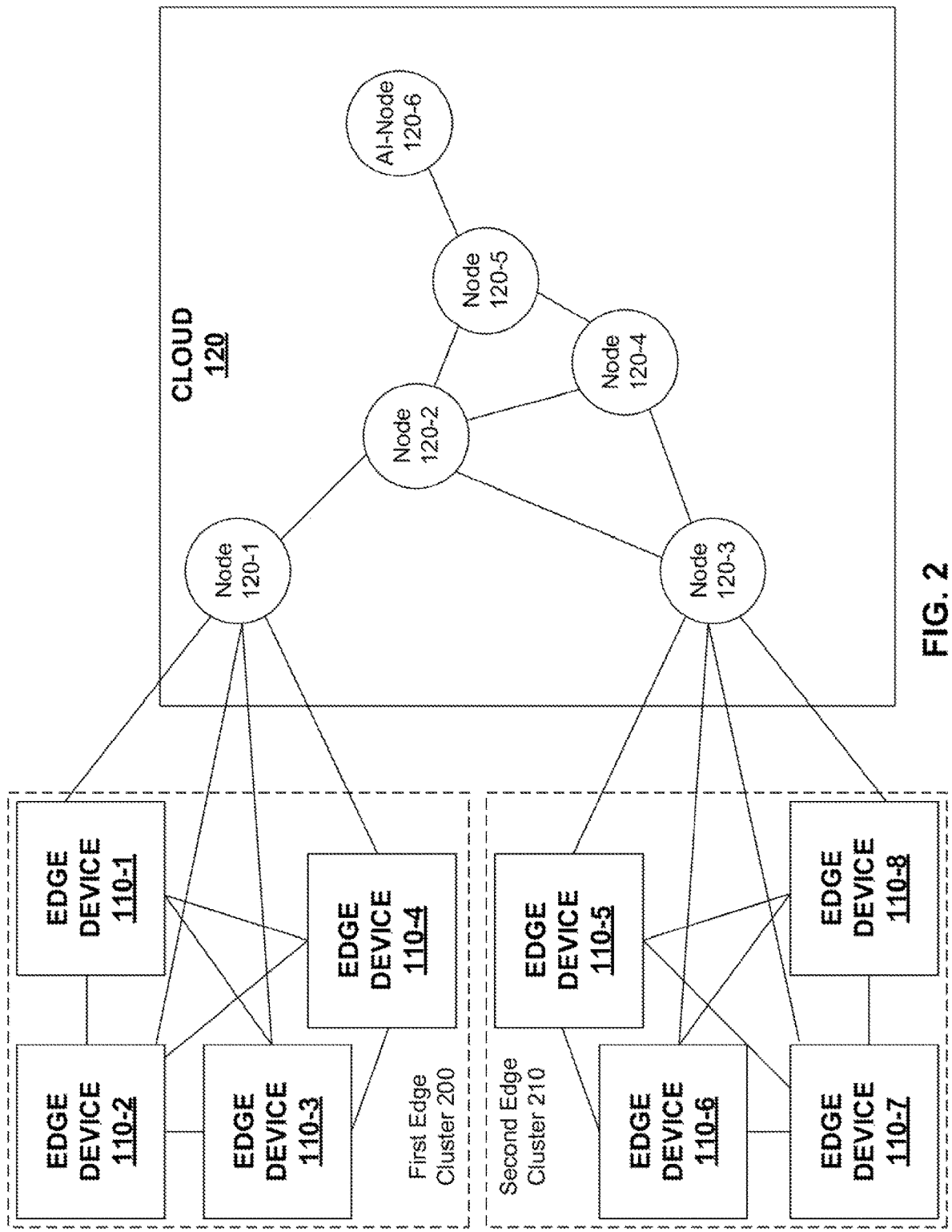
FIG. 2 illustrates an example distributed AI system, in accordance with an embodiment of the invention.

FIG. 2 depicts an example embodiment of the interactions between a cloud 120 and a first edge cluster 200 and a second edge cluster 210. In the example embodiment, cloud 120 contains general nodes 120-1, 120-2, 120-3, 120-4, and 120-5 (hereinafter referred to as "general nodes"). The general nodes may represent physical or virtual machines of the cloud network, and each general node may be in communication with one or more edge clusters. The general nodes may serve the purpose of managing communications to, and from, each edge cluster, aggregating non-PII 128 amongst the general nodes, and communicating with an AI-node 120-6. The AI-node 120-6 may be a virtual machine, API, or dedicated hardware running on a cloud 120 that may create parameters of cloud model 122, or periodically update cloud model 122, based on non-PII 128.

Still referring to FIG. 2, a first edge cluster 200 may contain one or more edge devices such as edge device 110-1, edge device 110-2, edge device 110-3, and edge device 110-4. A second edge cluster 210 may contain one or more edge devices such as edge device 110-5, edge device 110-6, edge device 110-7, and edge device 110-8. In the depicted embodiment, edge devices of the first edge cluster 200 may share non-PII 128, or alternatively may share model parameters, such that the edge model 112 for each device of the first edge cluster 200 is substantially similar or identical. Similarly, edge devices of the second edge cluster 210 may share non-PII 128, or alternatively may share model parameters, such that the edge model 112 for each device of the second edge cluster 210 is substantially similar or identical. However, due to the lazy learning techniques implemented individually by each edge cluster, the edge model 112 for the first edge cluster 200 may be different from the edge model 112 for the second edge cluster 210, and both may be different from cloud model 122. Such differences, and the amount of such differences, may be due to local variations in behavior amongst members of each edge cluster.

Still referring to FIG. 2, the boundary for an edge cluster, such as the first edge cluster 200 and the second edge cluster 210, may be set based on the problem space, using variables that have a high degree of model correlation between users. For example, in a context of Fantasy Football, the favorite team of users may suggest a high degree of similarity amongst the group of users, and thus may for a criterion for inclusion into an edge cluster.

Figure 3:
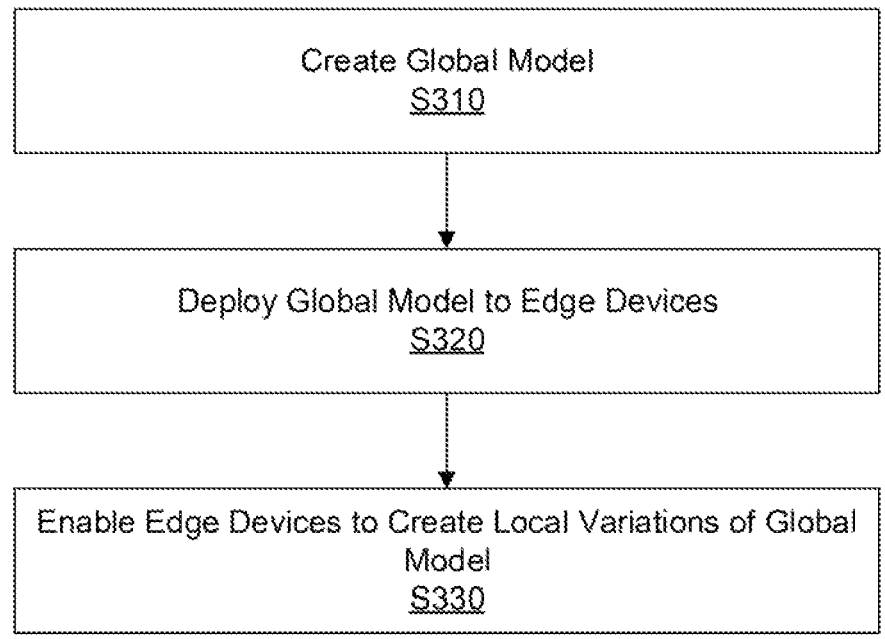
FIG. 3 is a flowchart illustrating the stages of model deployment in the distributed AI system of FIG. 1, in accordance with an embodiment of the invention.

FIG. 3 is a flow chart illustrating a method of deployment of the cloud model 122 to edge devices. At step S310, the cloud model 122 is created on the cloud 120 (e.g., from AI-Node 120-6). The cloud model 122 may be created from a combination of AI, data analysis, scoring, and data engineering algorithms, which may be bundled together as cloud model 122. The cloud model 122 may be initially trained using non-PII 128, which may be aggregated from non-PII 118 located on each edge device, as well as using other public or proprietary training data for the cloud model 122.

At step S320, the cloud model 122 may be deployed from the AI-Node 120-6 of the Cloud 120, through adjoining nodes and to an edge device 110. At this stage, the cloud model 122 being deployed to each edge device 110 is identical, and each edge device receives a cloud model 122 with the same algorithms, hyperparameters, weights, etc.

At step S330, the cloud model 122 may be stored as cloud model 114 on edge device 110. Additionally, edge device 110 may make an initial copy of cloud model 114 parameters, which may act as an initial edge model 112, prior to any local training of the model that may occur.

Figure 4:
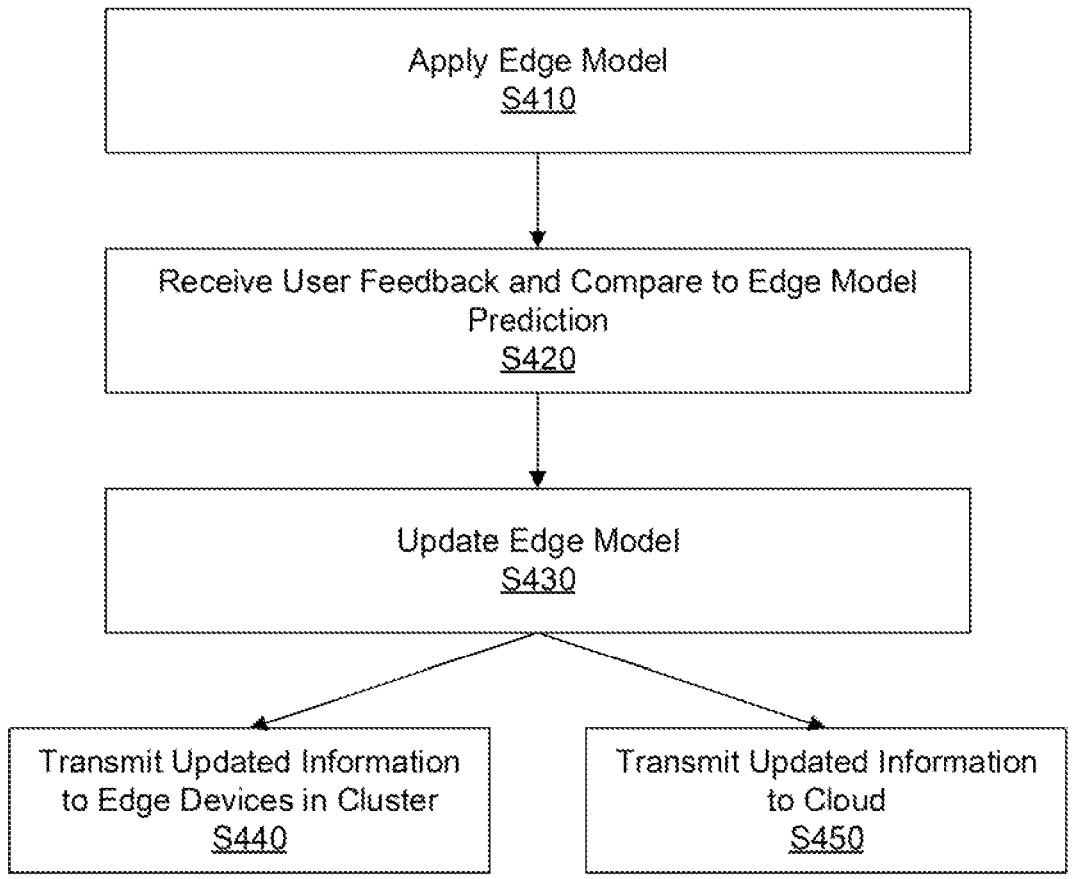
FIG. 4 is a flowchart illustrating the operation of the edge cluster program of FIG. 1, in accordance with an embodiment of the invention.

FIG. 4 is a flow chart depicting operation of an edge cluster program 111 to use and update edge model 112 and transmit said updates. At step S410, the edge model 112 applies information contained in PII 116 and non-PII 118 to achieve a predictive outcome based on the algorithms and weights contained in the edge model 112. The edge cluster program 111 may display the results of the predictive outcome or use the predictive outcome to modify some parameter (e.g., display, voice recognition parameters) of the edge device 110 based on the predictive outcome.

At step S420, edge cluster program 111 may receive user feedback of the produced prediction. For example, the user may agree or disagree with an outcome predicted by the edge model 112 or may modify the result of the edge model 112, based on their own preferences.

At step S430, edge cluster program 111 may update the edge model 112 based on the user feedback. Updates to the edge model 112 may be done using a lazy learning update scheme, in combination with PII 116 and non-PII 118 contained on the edge device 110. In such an implementation, lazy learning may enable each device to update the cloud model 114 without the computational resources required by to build and train a model from scratch. Additionally, such local learning, through lazy learning techniques, may enable local variations of the model to arise, while keeping PII 116 localized to a single device (or local devices allowed to access such PII).

At step S440, edge cluster program 111 transmits updated information to other edge devices in the cluster. In one embodiment, the updated information may be updated weights or other model parameters of edge model 112 that were updated during step S430. In another embodiment, the updated information may be non-PII 118, as well as the feedback received in step S420, so that each edge device may perform the update described in step S430. The transmission of the updated information may be performed based on a machine learning model that accounts for availability of edge device 119, in order to coordinate transmission of non-PII 118 and edge model 112 back to other edge devices 110 in an edge cluster.

At step S450, edge cluster program transmits updated information to a node in the cloud. The updated inform information may be updated weights or other model parameters of edge model 112 that were updated during step S430. In another embodiment, the updated information may be non-PII 118, as well as the feedback received in step S420. The transmission of the updated information may be performed based on a machine learning model that accounts for edge device 110 availability, in order to coordinate transmission of non-PII 118 and model hyperparameters 124 of edge model 112 back to the cloud 120.

In a first example use case of the above described system, the cloud model 122 may be trained for use to play, for example, Fantasy Football. The initial cloud model 122 may be trained using scores and statistics from previous Football seasons to create a predictive model for predictive scores for a player for any given matchup. The cloud model 122 may use these predictive scores to assign values to such players in order to aid in comparing players for drafting, trades or lineup selection. The cloud model 122 may be released to a plurality of edge devices, which update the original cloud model 122 to edge model 112 based on actions performed by users in the group. In one example of this use case, each edge cluster may be defined by geography, and thus the edge model 112 may account for geographical preferences of certain players over another, thereby updating a predicted draft rank based on the regional differences. For example, if first edge cluster 200 is located near Minneapolis, Minn. and second edge cluster 210 is located in Wisconsin, the second edge cluster 210 may provide a higher draft position for Aaron Rodgers than first edge cluster 200.

In a second example use case, the cloud model 122 may be trained for speech recognition. In one example of this use case, each edge cluster may be defined by geography, and thus the edge model 112 may account for regional variations in dialect or usage. For example, if first edge cluster 200 was located in the South of the United States, the term y'all may be a substitute for the term you all in a second edge cluster 210 located in the North of the United States.

In a third example use case, the cloud model 122 may be trained as the AI controlling a non-player character (NPC) in a video game. In this example, each edge cluster may be defined based on user friend groups and may enable the edge model 112 to account for variations in play amongst different user groups. In this example, edge model 112 may make different decisions in a first edge cluster 200 than in a second edge cluster 210 based on variation in the style of play between these independent user groups.

Figure 5:
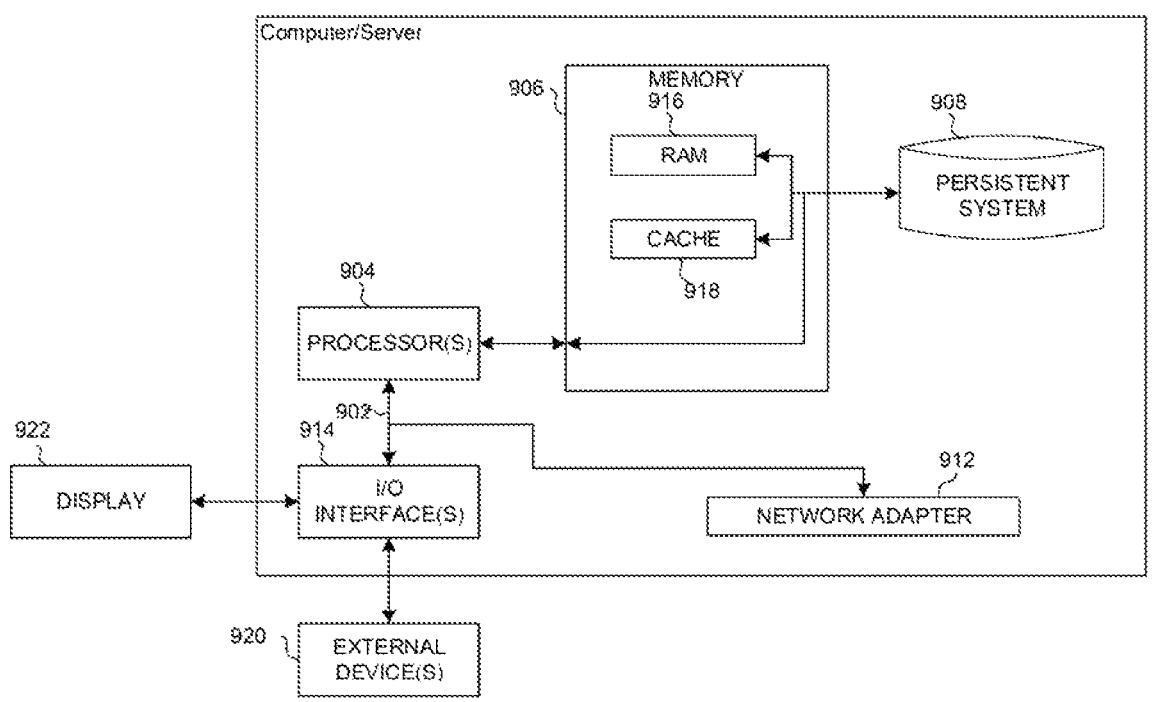
FIG. 5 is a block diagram depicting the hardware components of the edge device of FIG. 1, in accordance with an embodiment of the invention.

FIG. 5 depicts a block diagram of components of edge device 110 and cloud 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Edge device 110 and cloud 120 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The edge cluster program 111, edge model 112, cloud model 114, PII 116, and non-PII 118 in edge device 110; and cloud model 122, model hyperparameters 124, and non-PII 128 in cloud 120 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. The edge cluster program 111, edge model 112, cloud model 114, PII 116, and non-PII 118 in edge device 110; and cloud model 122, model hyperparameters 124, and non-PII 128 in cloud 120 may be downloaded to persistent storage 908 through communications unit 912.

I/O interface(s) 914 allows for input and output of data with other devices that may be connected to edge device 110 and social media cloud 120. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., the edge cluster program 111, edge model 112, cloud model 114, PII 116, and non-PII 118 in edge device 110; and cloud model 122, model hyperparameters 124, and non-PII 128 in cloud 120, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
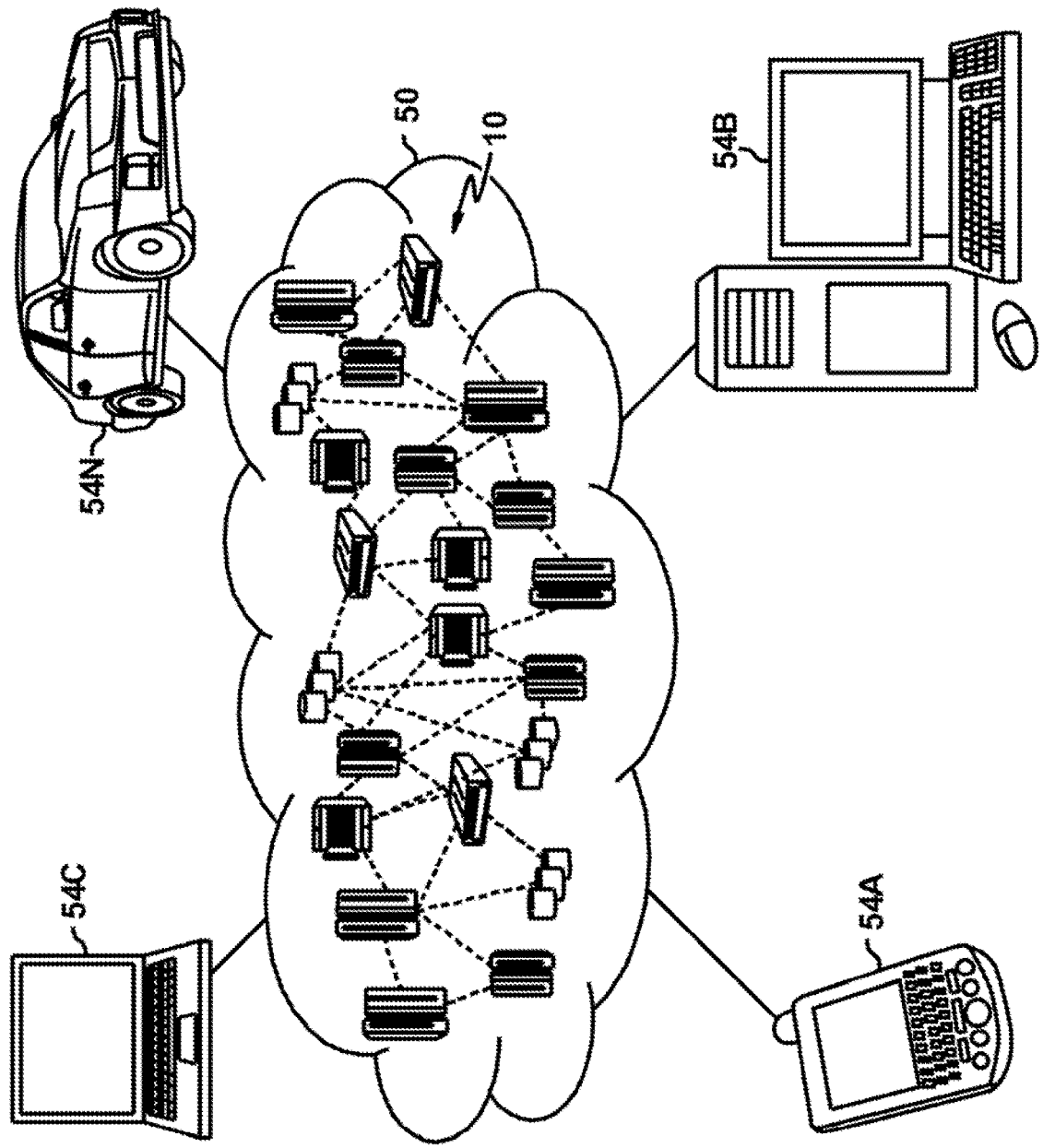
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 7:
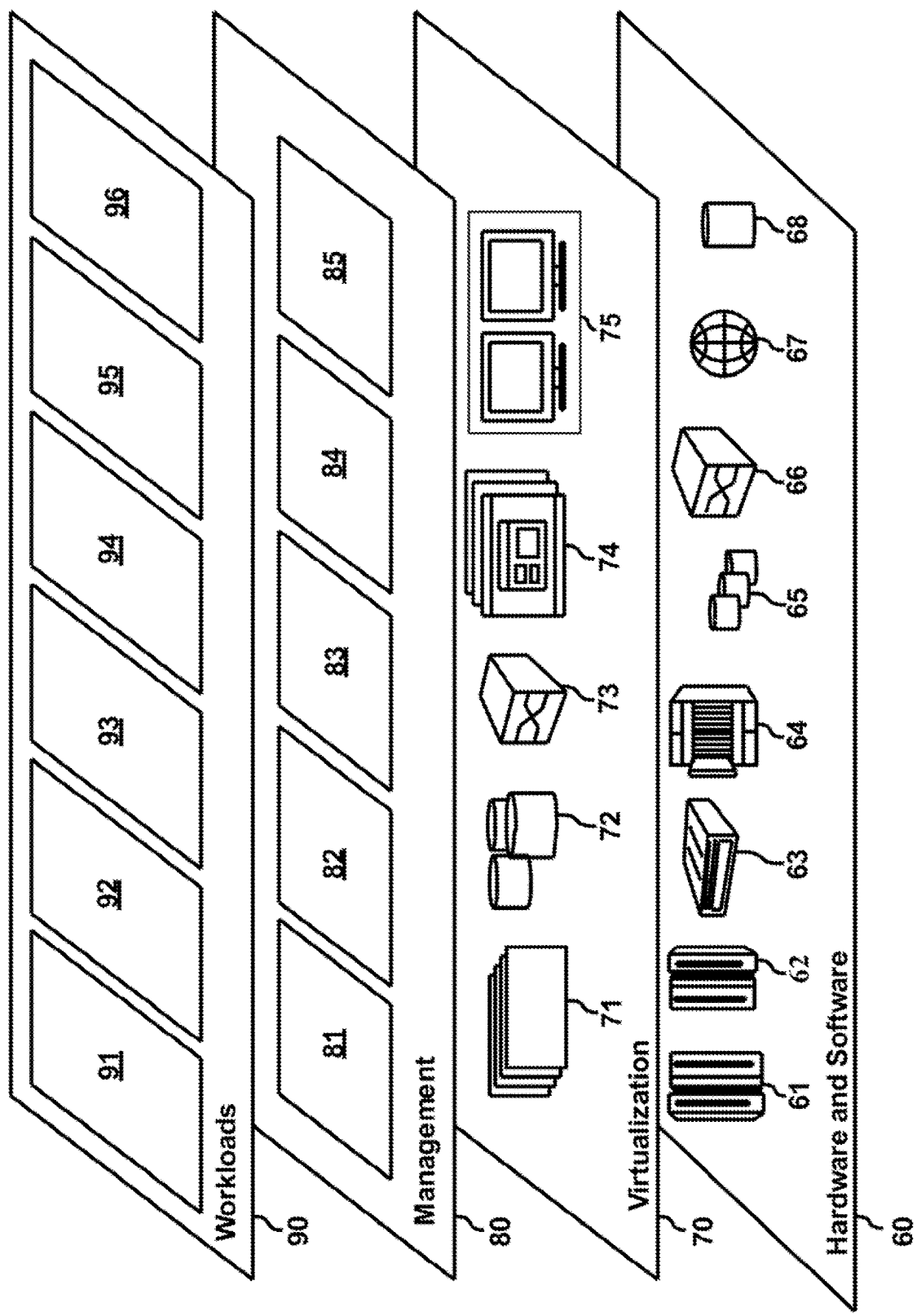
FIG. 7 depicts abstraction model layers according to an embodiment of the present invention.

Referring now to FIG. 7, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and managing distributed models 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for managing a machine learning algorithm without directly sharing Personally Identifiable Information (PII) data between devices including a plurality of computing devices, the method comprising:
   receiving, by a first edge device of the plurality of computing devices, a first Artificial Intelligence (AI) model, wherein
      the first AI model is received from a cloud device of the devices, and
      the plurality of computing devices is grouped in a cluster based on one of: a geographical location of each computing device of the plurality of computing devices, or a user group in a game associated with each computing device of the plurality of computing devices;
   generating, by the first edge device, one or more prediction results, using the first AI model;
   receiving, by the first edge device, at least one user feedback for the one or more prediction results, wherein the at least one user feedback corresponds to modifications of the one or more prediction results based on preferences of a user of the first edge device;
   updating, by the first edge device, the first AI model based on the PII data associated with the first edge device, non-PII data associated with the first edge device, and the received at least one user feedback, wherein the non-PII data indicates choices or decisions made by the user;
   generating, by the first edge device, a second AI model based on the updating of the first AI model one or more hyperparameters associated with the second AI model are calculated, using a lazy learning technique, based upon the PII data, the non-PII data, and the received at least one user feedback;
   sending, by the first edge device to a second edge device of the plurality of computing devices grouped in the cluster, the one or more hyperparameters, and the non-PII data, wherein a third AI model stored on the second edge device is updated using the one or more hyperparameters and the non-PII data; and
   sending, by the first edge device to the cloud device, data including the one or more hyperparameters, and the non-PII data, wherein
      the data is sent by masking of the PII data,
      the masking of the PII data corresponds to exclusion of the PII data from the data sent by the first edge device to the cloud device, and
      a fourth AI model stored on the cloud device is updated using the one or more hyperparameters and the non-PII data.

2. The method of claim 1, wherein the first AI model is based on a K-nearest neighbor algorithm.

3. The method of claim 1, wherein a timing of the sending of the one or more hyperparameters from the first edge device to the second edge device is based on an availability of the first edge device.

4. A computer program product for managing a machine learning algorithm without directly sharing Personally Identifiable Information (PII) data between devices including a plurality of computing devices, the computer program product comprising:
   one or more computer readable storage media; and program instructions collectively stored on the one or more computer readable storage media to perform operations comprising:

receiving, by a first edge device of the plurality of computing devices, a first Artificial Intelligence (AI) model, wherein
the first AI model is received from a cloud device of the devices, and
the plurality of computing devices is grouped in a cluster based on one of: a geographical location of each computing device of the plurality of computing devices, or a user group in a game associated with each computing device of the plurality of computing devices;

generating, by the first edge device, one or more prediction results using the first AI model;

receiving, by the first edge device, at least one user feedback for the one or more prediction results, wherein the at least one user feedback corresponds to modifications of the one or more prediction results based on preferences of a user of the first edge device;

updating, by the first edge device, the first AI model based on the PII data associated with the first edge device, non-PII data associated with the first edge device, and the received at least one user feedback, wherein the non-PII data indicates choices or decisions made by the user;

generating, by the first edge device, a second AI model based on the updating of the first AI model one or more hyperparameters associated with the second AI model are calculated, using a lazy learning technique, based upon the PII data, the non-PII data, and the received at least one user feedback;

sending, by the first edge device to a second edge device of the plurality of computing devices grouped in the cluster, the one or more hyperparameters, and the non-PII data, wherein a third AI model stored on the second edge device is updated using the one or more hyperparameters and the non-PII data; and sending, by the first edge device to the cloud device, data including the one or more hyperparameters, and the non-PII data, wherein
the data is sent by masking of the PII data,
the masking of the PII data corresponds to exclusion of the PII data from the data sent by the first edge device to the cloud device, and
a fourth AI model stored on the cloud device is updated using the one or more hyperparameters and the non-PII data.

5. The computer program product of claim 4, wherein the first algorithm AI model is based on a K-nearest neighbor algorithm.

6. The computer program product of claim 4, wherein a timing of the sending of the one or more hyperparameters from the first edge device to the second edge device is based on an availability of the first edge device.

7. A computer system for management of a machine learning algorithm without directly sharing Personally Identifiable Information (PII) data between devices including a plurality of computing devices, the computer system comprising:
one or more processors;
one or more computer-readable storage devices; and
program instructions stored on at least one of the one or more computer-readable storage devices, the program instructions executable by at least one processor of the one or more processors to cause the at least one processor to:

receive, by a first edge device of the plurality of computing devices, a first Artificial Intelligence (AI) model, wherein
the first AI model is received from a cloud device of the devices, and
the plurality of computing devices is grouped in a cluster based on one of: a geographical location of each computing device of the plurality of computing devices, or a user group in a game associated with each computing device of the plurality of computing devices;

generate, by the first edge device, one or more prediction results, using the first AI model;

receive, by the first edge device, at least one user feedback for the one or more prediction results, wherein the at least one user feedback corresponds to modifications of the one or more prediction results based on preferences of a user of the first edge device;

update, by the first edge device, the first AI model based on the PII data associated with the first edge device, non-PII data associated with the first edge device, and the received at least one user feedback, wherein the non-PII data indicates choices or decisions made by the user;

generate, by the first edge device, a second AI model based on the update of the first AI model, wherein one or more hyperparameters associated with the second AI model are calculated, using a lazy learning technique, based upon the PII data, the non-PII data, and the received at least one user feedback;

send, by the first edge device to a second edge device of the plurality of computing devices grouped in the cluster, the one or more hyperparameters, and the non-PII data, wherein a third AI model stored on the second edge device is updated using the one or more hyperparameters and the non-PII data; and send, by the first edge device to the cloud device, data including the one or more hyperparameters, and the non-PII data, wherein
the data is sent based on the PII data being masked,
the PII data being masked corresponds to exclusion of the PII data from the data sent by the first edge device to the cloud device, and
a fourth AI model stored on the cloud device is updated using the one or more hyperparameters and the non-PII data.

8. The computer system of claim 7, wherein the first AI model is based on a K-nearest neighbor algorithm.

9. The computer system of claim 7, wherein a timing at which the hyperparameters are sent from the first edge device to the second edge device is based on an availability of the first edge device.

* * * * *